US006218830B1

United States Patent
Yoshida et al.

(10) Patent No.: US 6,218,830 B1
(45) Date of Patent: Apr. 17, 2001

(54) METHOD AND APPARATUS FOR ENHANCED DETECTING THE PRESENCE OF MAGNETIC SUBSTANCES IN NON-MAGNETIC PRODUCTS

(75) Inventors: Yasuhiko Yoshida, Kurobe; Hiromitsu Horita, Toyama; Shinichi Kojima, Kurobe, all of (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 09/141,757

(22) Filed: Aug. 28, 1998

(30) Foreign Application Priority Data

Aug. 29, 1997 (JP) .................................................. 9-247614

(51) Int. Cl.[7] .................................................. G01N 27/72
(52) U.S. Cl. ........................... 324/228; 324/239; 209/567
(58) Field of Search ................................. 324/228, 239, 324/234, 236, 243, 240; 209/567; 340/551, 568

(56) References Cited

U.S. PATENT DOCUMENTS

| 4,734,643 | * | 3/1988 | Bubenik et al. . | |
| 4,806,863 | * | 2/1989 | White | 324/238 |
| 4,814,702 | * | 3/1989 | Driggers et al. | 324/207 |
| 5,039,981 | * | 8/1991 | Rodriguez | 340/551 |
| 5,269,192 | * | 12/1993 | Utsui et al. | 73/862.335 |
| 5,923,165 | * | 7/1999 | Horita et al. | 324/239 |
| 6,016,055 | * | 1/2000 | Jiger et al. | 324/165 |

FOREIGN PATENT DOCUMENTS

| 56-36049 | * | 4/1981 | (JP) . |
| 4-82958 | * | 3/1992 | (JP) . |
| 9-80162 | | 3/1997 | (JP) . |
| 9-122372 | | 5/1997 | (JP) . |

OTHER PUBLICATIONS

Abstract of Japanese 09–080162 of Mar. 28, 1997, *Patent Abstracts of Japan*, vol. 1997, No. 07, Jul. 31, 1997.
Abstract of Japanese 09–122372 of May 13, 1997, *Patent Abstracts of Japan*, vol. 1997, No. 09, Sep. 30, 1997.
Atherton et al, "An AC differential Hall probe for residual magnetic field measurements", *NDT International*, vol. 17, No. 3, Jun. 1984, pp. 155–159.

* cited by examiner

Primary Examiner—Christine Oda
Assistant Examiner—Subhash Zaveri
(74) Attorney, Agent, or Firm—Finnegan, Henderson, Farabow, Garrett, & Dunner, L.L.P.

(57) ABSTRACT

Disclosed are a method and an apparatus for easily, sensitively and reliably detecting the presence of a magnetic substance in a non-magnetic product, and even a minuted magnetized material such as a broken needle erroneously included in a sewn product. Magnetic sensors as a sensing unit are disposed at a prescribed position between a pair of opposed magnetic shielding members made of a soft magnetic material as a magnetic flux converging unit. A non-magnetic product including a magnetic substance is passed through between the pair of magnetic shielding members. A magnetic flux generated by the magnetic substance mingled in the product is converged to the magnetic shielding members, while shutting off a magnetic field due to external disturbance, and residual magnetization of the magnetic substance is detected by the magnetic sensors. Preferably, each of the magnetic shielding members has a curved surface projecting inwardly in the form curved along the conveyance direction of the non-magnetic product, and a plurality of magnetic sensors are disposed on each of the curved surfaces at intervals of a prescribed size in the lateral direction thereof.

33 Claims, 9 Drawing Sheets

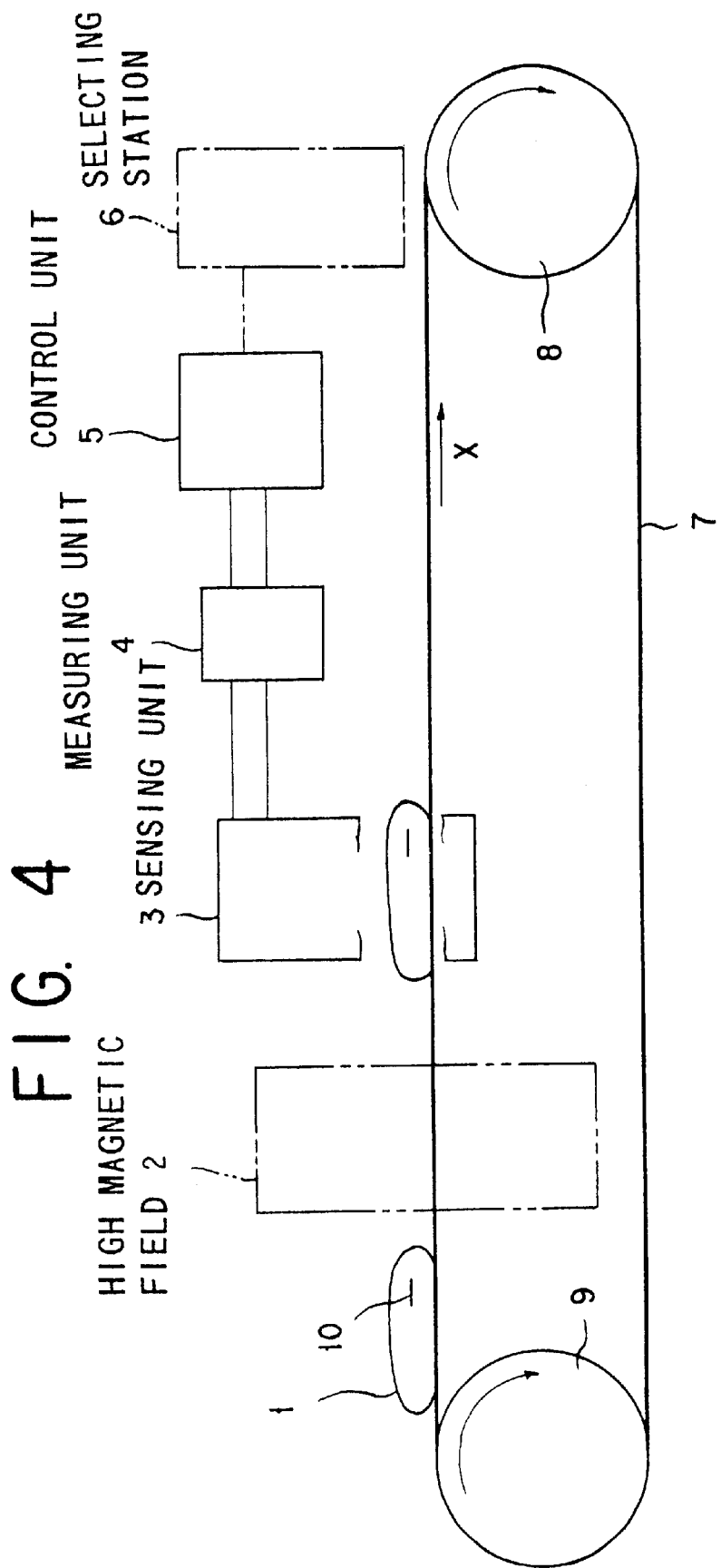

METHOD AND APPARATUS FOR ENHANCED DETECTING THE PRESENCE OF MAGNETIC SUBSTANCES IN NON-MAGNETIC PRODUCTS

BACKGROUND OF THE INVENTION

1. Field of the Invention

This invention relates to a method and apparatus for easily and reliably detecting the presence of magnetic substances such as metallic pieces which have been erroneously incorporated in various non-magnetic products such as sewn products, woven and/or knitted products, non-woven fabrics, carpets, tatamis (straw matting), foods, and medical products, particularly broken needles which have been erroneously mingled in sewn products in the sewing process.

2. Description of the Prior Art

The possibility that magnetic substances such as metallic pieces will erroneously enter such various products as mentioned above during or after the course of manufacture is undeniable. When the sewing needles attached to sewing machines are broken or the pins are mislaid, they will possibly enter sewn products after the sewing process. When fasteners are sewn to garments, the possibility exists that the leading ends of sewing needles of sewing machines will break off and disappear in the seems between fasteners and garments. The products holding this possibility, therefore, must be deprived of metallic pieces such as lost needles before they are shipped. Now that the liabilities on the part of producers have been growing particularly since the enforcement of the law concerning the products liability, the problem of the entry of broken needles such as is incurred during the course of sewing fasteners to garments has been gaining in seriousness.

Heretofore, the detection of lost needles such as broken needles has been attained by utilizing the fact that a magnetic field is disturbed when a magnetic substance crosses the magnetic field as disclosed in published Japanese Patent Applications, KOKAI (Early Publication) No. 4-82,958 and No. 56-36,049, for example. To be specific, when a detecting coil is disposed in a magnetic field and a sewn product containing a magnetic substance erroneously incorporated therein is passed through the magnetic field, the magnetic field is disturbed owing to the presence of the magnetic substance and this disturbance of the magnetic field induces a difference in the induced current generated in the detecting coil. Since this difference in the induced current is extremely feeble, it is amplified to a prescribed level to permit the detection of the magnetic substance.

In the case of a method for detecting a magnetic substance by utilizing the disturbance of a magnetic field (a method for detecting a magnetic substance by passing a product under test through a magnetic field) mentioned above, even when a metallic piece which is not a magnetic substance adheres to a sewn product and it happens to have a certain size, this metallic piece never fails to affect the magnetic field and form a cause for mistaken detection. In the case of a fastener to which an aluminum slider or a die-cast zinc slider is attached or a sewn product to which such a fastener is sewn, when the fastener or the sewn product passes through the magnetic field, the slider induces another magnetic field due to an eddy current and disturbs the applied magnetic field. Then, the apparatus for detecting lost needles fails to discern whether the detected disturbance in the magnetic field (induced current) has been caused by a magnetic substance (needle) mingled in the sewn product or by the slider and forms an erroneous judgement that the sewn product contains a magnetic substance (needle) notwithstanding it is not containing one.

The possible effect of an external noise on the detection cannot be ignored because the difference of the induced current which is generated in the detecting coil by the disturbance of the magnetic field is extremely feeble. Since the magnetic substance generates no difference in the induced current flowing through the detecting coil unless this magnetic substance is moved, the apparatus is incapable of discriminating whether or not the magnetic substance (needle) is included in a sewn product under test when the sewn product containing the magnetic substance (needle) is transferred at a low speed or it is kept at a stopped state. Conversely, when sewn products are transferred at a high speed, the apparatus incurs difficulty in selecting only the sewn products that are containing magnetic substances (needles).

SUMMARY OF THE INVENTION

An object of the present invention, therefore, is to provide a method and an apparatus for easily, sensitively and reliably detecting the presence of magnetic substances erroneously included in such various non-magnetic products as mentioned above, and even minute magnetic substances such as broken needles contained erroneously in sewn products.

Another object of the present invention is to provide a detecting method and an apparatus for the detection which are capable of detecting the presence of magnetic substances included in the products even when the products have sewn thereto fasteners or other articles made of a non-magnetic metal which affect a magnetic field or they are bulky, and further even when they are being conveyed or being kept at a stopped state.

To accomplish the objects mentioned above, the first aspect of the present invention resides in providing a method for detecting the presence of magnetic substances in non-magnetic products. The first embodiment of this aspect concerns a method for the detection of a magnetic substance included in a non-magnetic product, characterized by applying to the product a magnetic field, preferably the magnetic field of intensity equivalent to or greater than that required for imparting saturated magnetization thereto, then converging a magnetic flux of the residual magnetization of a magnetic substance included in the product to detect the residual magnetization, and judging or determining the presence or absence of the magnetic substance in the product on the basis of the detected residual magnetization.

The second embodiment of the above aspect concerns a method for the detection of a magnetic substance included in a non-magnetic product, characterized by preparatorily applying a magnetic field, preferably the magnetic field of intensity equivalent to or greater than that required for imparting saturated magnetization, to a magnetic substance having the possibility of mingling in the non-magnetic product thereby causing the magnetic substance to assume a state of possessing residual magnetization, then converging a magnetic flux of the residual magnetization of the magnetic substance included in the product to detect the residual magnetization, and judging or determining the presence or absence of the magnetic substance in the product based on the detected residual magnetization.

Preferably, in either of the embodiments mentioned above, a magnetic sensor or magnetometric sensor is disposed at a prescribed position between a pair of opposed soft magnetic members, the non-magnetic product is located or passed through between the pair of soft magnetic members so that a magnetic field caused by external disturbance is absorbed into these soft magnetic members and that a magnetic flux generated by the magnetic substance included in the product is converged to the soft magnetic members, and thus the residual magnetization of the magnetic substance is detected by the magnetic sensor. The detection of the residual magnetization of a magnetic substance such as a metallic piece or a needle which is mingled in a non-magnetic product may be properly attained by arranging a plurality of magnetic sensors as spaced at intervals of a prescribed size in the direction of width of the non-magnetic product and moving the magnetic sensors relative to the non-magnetic product. The relative movement of the non-magnetic product and the magnetic sensors can be accomplished by moving (imparting a scanning motion to) the magnetic sensors. In consideration of the adaptability of the apparatus under discussion to the existing production line and the workability thereof, however, it is desirable that the residual magnetization of the magnetic substance included in the non-magnetic product be detected, while moving the non-magnetic product so as to pass through between the pair of soft magnetic members, by the plurality of magnetic sensors disposed as opposed across a prescribed distance to the product in motion and arranged and fixed at intervals of a prescribed size in a direction substantially perpendicular to the direction of the movement of the non-magnetic product. When the non-magnetic product happens to be a sewn article, for example, the detection of the residual magnetization of a needle included in the sewn product may be attained by a measure which comprises magnetizing the needle to be used in the sewing work and subjecting the product sewn with the magnetized needle to the scanning operation immediately after the sewing work.

The second aspect of the present invention resides in providing an apparatus for detecting the presence of a magnetic substance in a non-magnetic product. The first basic embodiment thereof is an apparatus for the detection of a magnetic substance included in a non-magnetic product by detecting residual magnetization of the magnetic substance in the non-magnetic product, characterized by comprising means for detecting residual magnetization of the magnetic substance included in the non-magnetic product and means for converging a magnetic flux of the residual magnetization to the detecting means (means for heightening a signal ratio), preferably while shielding the detecting means from a magnetic field caused by external disturbance.

The second embodiment of the apparatus is characterized by comprising means for conveying the non-magnetic product, detecting means disposed in the proximity of the conveying means and adapted to detect residual magnetization of the magnetic substance included in the non-magnetic product, means for converging a magnetic flux of the residual magnetization to the detecting means (means for heightening a signal ratio), preferably while shielding the detecting means from a magnetic field caused by external disturbance, and means for determining the presence or absence of the magnetic substance in the product based on the information from the detecting means. This apparatus preferably further comprises means for measuring the intensity of the residual magnetization of the magnetic substance detected by the detecting means.

The magnetic substance included in the non-magnetic product may have been preparatorily magnetized as in the case of a sewing needle which has the possibility of being mingled in a sewn product. It may be otherwise magnetized preparatory to the detection by a measure which comprises disposing magnetic field generating means on the upstream side of the detecting means.

In a preferred embodiment, the detecting means comprises a plurality of magnetic sensors arranged at intervals of a prescribed size in a direction substantially perpendicular to the direction of movement of the non-magnetic product.

As the converging means mentioned above, it is preferable to use a magnetic shielding member made of a soft magnetic material provided at the back side of the detecting means. Preferably a pair of magnetic shielding members made of a soft magnetic material is used as the converging means so that a non-magnetic product is located or passed through between the pair of magnetic shielding members. For instance, the converging means may comprise a framework opened at front and rear sides (in the conveyance direction of a non-magnetic product) and having at least one pair of opposed wall plates each formed of a magnetic shielding member of a soft magnetic material, a plurality of detecting means are disposed in series in the lateral direction on an inner surface of the magnetic shielding member, and the conveying means is disposed inside the framework in such a manner that the conveying means extends from the rear side to the front side of the framework therethrough. It is preferable that the magnetic shielding member should have a curved surface projecting toward a non-magnetic product to realize a larger magnetic flux converging effect.

In a more preferable embodiment of the apparatus, in order to absorb or shut off the disturbance of a magnetic field due to external disturbance and to highten the magnetic flux converging effect, the framework comprises upper and lower plates each formed of a magnetic shielding member of a soft magnetic material and having a curved surface projecting inwardly in the form curved along the conveyance direction of a non-magnetic product, two side plates made of a non-magnetic material, and further magnetic shielding members of a soft magnetic material provided in both sides for covering the two side plates, and a plurality of magnetic sensors as detecting means are disposed on the curved surfaces of the upper and lower plates mentioned above at intervals of a prescribed size in the lateral direction thereof.

BRIEF DESCRIPTION OF THE DRAWINGS

Other objects, features, and advantages of the invention will become apparent from the following description taken together with the drawings, in which:

FIG. 4 is a schematic structural diagram illustrating one embodiment of the detecting apparatus of the present invention;

DETAILED DESCRIPTION OF THE PREFERRED EMBODIMENTS

Figure 1:
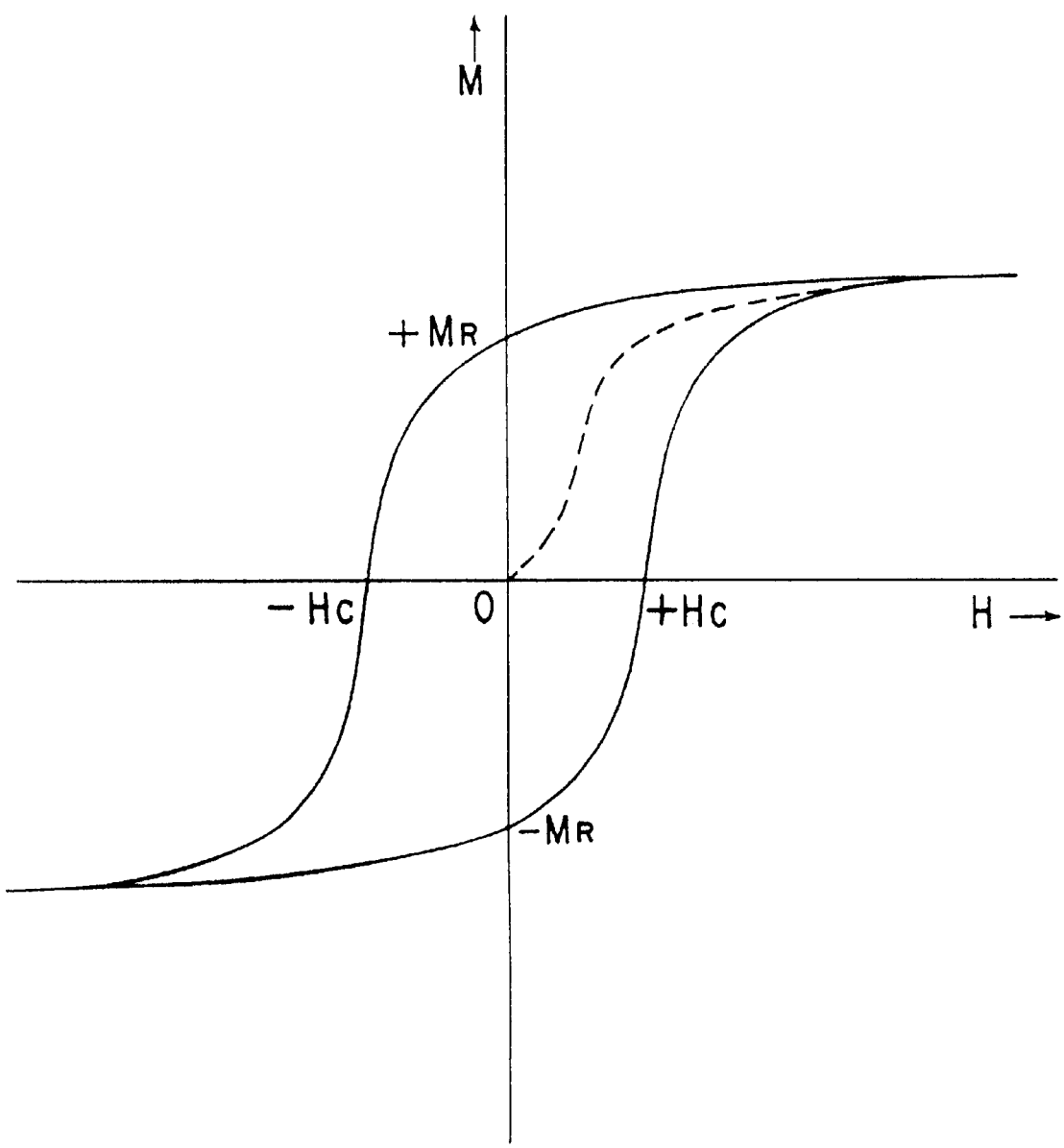
FIG. 1 is a graph showing the hysteresis curve of a ferromagnetic substance.

The detection of a magnetic substance in a non-magnetic product according to the present invention is characterized by detecting residual magnetization of the magnetic substance which is magnetized in advance and converging a magnetic flux generated by the magnetic substance to detecting means while shutting off a magnetic field due to external disturbance during the course of detecting the residual magnetization.

The present inventors have developed a method of detecting the presence of a magnetic substance in a non-magnetic product by having resort to the detection of residual magnetization of the magnetic substance. This method provides the advantage that measurement can be made without being affected by the presence of a slider or the like attached to the non-magnetic product such as a sewn product regardless of whether the non-magnetic product with the magnetic substance mingled therein is conveyed or kept at a stopped state. However, as in the case of detection of a minute magnetized material such as a broken needle mingled in a bulky non-magnetic product such as skiwear, the more the distance between a magnetic substance to be detected and a magnetic sensor is large or the size of the magnetic substance is small, the more the magnetic flux reaching the magnetic sensor is weak. When the sensitivity of the magnetic sensor is increased to eliminate such a drawback, noises are sensed contrarily.

To solve the problem described above, the present invention utilizes means for converging the magnetic flux of the residual magnetization, such as a magnetic shielding member of a soft magnetic material, to absorb or shut off a magnetic field caused by external disturbance and, at the same time, to cause the dispersed magnetic flux generated by the magnetic substance to be absorbed into the soft magnetic material and converged to the magnetic sensor, so that the magnetic flux reaching the magnetic sensor is strengthened sufficiently to enable detection of the magnetic substance mingled in the non-magnetic product with high sensitivity even if the magnetic substance is a minute magnetized material such as a broken needle.

Now, the functions of the present invention will be explained hereinbelow.

The fundamental feature of the present invention resides in the fact that the detection of a magnetic substance in a non-magnetic product resorts to the detection of residual magnetization of the magnetic substance which is magnetized in advance.

The relation between the magnetic field H and the magnetic flux density B is expressed by the formula, $B=\mu_0 H$. In the formula, $\mu_0$ stands for the permeability in a vacuum. When a substance is brought into a space of a magnetic field, the magnetic flux induces a magnetic dipole in the substance and magnetizes this substance. Let M stand for the magnetic (dipolar) moment per unit volume of this substance, and the magnetic flux density B will be expressed as $B=\mu_0 H+M$. This symbol M is generally called magnetization. This formula has the magnetic flux density B increased by M as compared with the preceding formula covering the magnetic field in a vacuum. This means an increase of the magnetic flux by the magnetic dipole induced into the substance. Every substance is caused by a magnetic field to induce a magnetic moment. In this sense, it is called a magnetic substance. The magnetic substances are classified into ferromagnetic substances, diamagnetic substances, weakly magnetic substances, etc.

The magnitude of magnetization differs from one substance to another and varies with change of a magnetic field. In the case of the ferromagnetic substances, the magnitudes of magnetization are generally represented by such a hysteresis curve as shown in FIG. 1. In the diagram, the magnetization $M_R$ which remains after the magnetic field applied is returned to zero constitutes residual magnetization. Then, the magnitude of a magnetic field which is applied in the opposite direction for the purpose of nullifying the magnetization constitutes coercive force $H_c$.

A steel material which is the raw material for a needle, for example, is a ferromagnetic substance. When this steel material is magnetized and then deprived of a magnetic field, the residual magnetization $M_R$ shown in FIG. 1 persists in the steel material. Fasteners or sliders made of aluminum or die-cast zinc are weakly magnetic substances and, therefore, retain no residual magnetization. By seeking the residual magnetization, therefore, a missing needle (magnetic substance) mingled in such a non-magnetic product as a sewn product can be exclusively detected without being affected by the presence of a slider and so forth attached to the sewn product. This method can be applied to the detection of not only sewing needles but also all magnetic foreign objects exhibiting residual magnetization. Unlike the disturbance of magnetism which is resorted to by the conventional method, the residual magnetization of a magnetic substance which is utilized by this method can be detected without reference to the movement of the magnetic substance, i.e. no matter whether the non-magnetic product containing the magnetic substance is in motion or not. The term "non-magnetic" product as used in this specification means a product in which the residual magnetization defined above is not retained.

The characteristic feature of the present invention consists in that the magnetic flux generated by the magnetic substance is converged to detecting means, while shutting off a magnetic field due to external disturbance during the course of detecting residual magnetization.

Figure 2A:
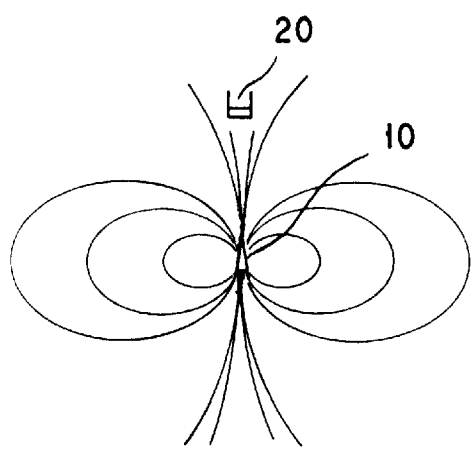
FIGS. 2A and 2B are schematic explanatory diagrams illustrating an example of a magnetic flux, FIG. 1A showing a state where the magnetic flux generated by a broken needle (magnetic substance) is not converged, while FIG. 1B showing a state where the magnetic flux is converged.
Figure 2B:
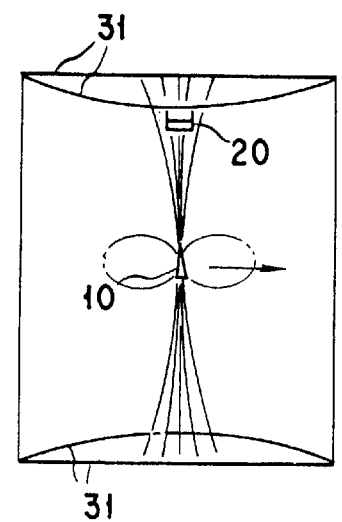
Figure 3A:
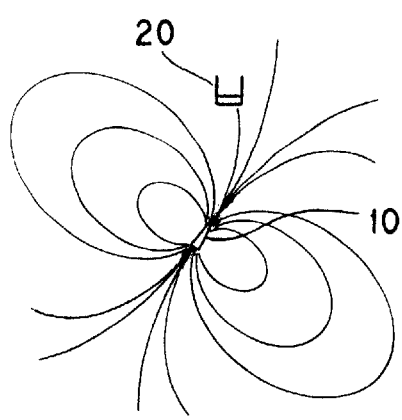
FIGS. 3A and 3B are schematic explanatory diagrams illustrating another example of a magnetic flux, FIG. 3A showing a state where the magnetic flux generated by a broken needle (magnetic substance) is not converged, while FIG. 3B showing a state where the magnetic flux is converged.

Description is made for this feature of the present invention with reference to FIG. 2A, FIG. 2B, FIG. 3A and FIG. 3B. FIG. 2A shows a state where a broken needle (magnetic substance) 10 previously magnetized and mingled in a non-magnetic product has the tip pointing to a magnetic sensor 20, while FIG. 3A shows a state where the broken needle 10 is slightly inclined, but both of the figures show a state where a magnetic flux generated by the broken needle is not converged according to the present invention.

Figure 3B:
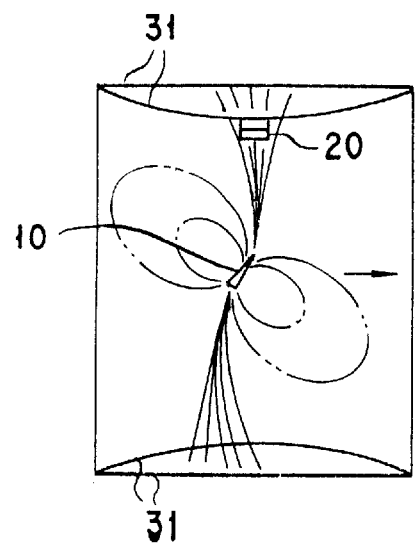

On the other hand, FIG. 2B and FIG. 3B show a state of the magnetic flux generated by the broken needle 10 when magnetic shielding members 31 as means for converging the magnetic flux are provided above and under a moving path (indicted by an arrow mark in the figures) of the broken needle 10. It should be noted that FIG. 2B and FIG. 3B show a state of the lines of magnetic flux in the case where only flat magnetic shielding members 31 are used (where magnetic shielding members each having a curved surface are not provided therein).

As clearly understood from comparison of FIG. 2B and FIG. 3B with FIG. 2A and FIG. 3A, by having the dispersed magnetic flux generated by the broken needle 10 as a minute magnetized material absorbed by the upper and lower magnetic shielding members 31 and converging the magnetic flux in the vertical direction, it is possible to strengthen the magnetic flux coming into the magnetic sensor 20 as detecting means. At the same time, since a magnetic field (external disturbance) from the outside is shielded or absorbed by the above members, the sensor can detect only the magnetic field generated by the substance to be detected. As a result, even if the distance between the broken needle 10 and the magnetic sensor 20 are relatively large, the sensor can detect the broken needle 10, i.e. a minute magnetized material with high sensitivity. Especially when the upper and lower magnetic shielding members 31 are formed into a curved shape parallel to each other in the axial direction thereof but projecting toward the broken needle 10 along the direction of advance of the broken needle 10, it is possible to converge the magnetic flux to a further narrow area, which is more effective in detecting the broken needle.

In the method according to the present invention, since a magnetic field is not applied to the broken needle 10 during the course of detection thereof, unlike a conventional metal detector which detects a non-magnetic conductor (metal) as well as a magnetic substance because of the application of a magnetic field during measurement, only a magnetic substance having residual magnetization can selectively be detected in distinction from an electrically conductive material.

As the magnetic shielding members 31, among ferromagnetic materials with high magnetic permeability, a soft magnetic substance with a coercive force and residual magnetization both close to zero such as, for instance, permalloy, $\mu$ metal, pure iron, or stainless steel may be advantageously used.

It should be noted that, when detecting residual magnetization of the broken needle 10, it is necessary to pay attention so that the magnetic sensor 20 will not pick up hum noises, and for that purpose it is preferable to assemble the magnetic shielding members 31 into a framework with a structure like a closed-loop circuit. It is possible to suppress hum noises also by employing differential amplification. In this case, when the magnetic shielding member 31 has a curved surface, the curvature radius thereof is suitably set. When a magnetic sensor is differentially amplified by using, for instance, a highly sensitive magnetic sensor of the differential amplification type, it is possible to prevent noises from being picked up even if the magnetic shielding framework is slightly magnetized. It is preferable to form one set (one block) with a plurality of sensors each for differential amplification for detection. Also it is possible to combine a power source noise cut-off frequency selecting (signal-tuning) and amplifying circuit with a differentially amplifying circuit.

The non-magnetic products to which the method of the present invention can be applied cover all the non-magnetic products such as woven and/or knitted products (woven/knitted products), non-woven fabrics, carpets, tatamis (straw matting), foods, medical products, and collections of non-magnetic parts or products in addition to the sewn products mentioned above. Unforeseeable entry of broken needles is dangerous. For the sake of detecting broken needles mingled in sewn products and removing them, the method and apparatus of the present invention can be advantageously utilized. The woven/knitted products have the possibility of unwittingly admitting latch needles. Then, the tatamis and the bedclothes possibly admit such magnetic foreign objects as needles not only during but also after the stage of production. Further, in the case of sliders and top and bottom stops for slide fasteners and such accessorial devices as buttons, buckles, pendants, necktie pins, and watch chains, it is usual to manufacture non-magnetic products made of die-cast zinc or those further having a surface coating formed by the chromating treatment or further by the color clear coating treatment and nickel-plated magnetic products together within one factory. The possibility of the magnetic products mingling in the group of non-magnetic products through inadvertence is undeniable. The method of the present invention can be utilized also when the magnetic products are to be detected in the non-magnetic products and removed therefrom. Further, in the case of non-magnetic sliders, while the sliders are assembled by the incorporation of such parts as pullers, springs, and covers into slider bodies, there arises the possibility that parts made of magnetic substances will be incorporated in the slider assembled. The present invention can be used for the purpose of detecting assembled products which have admitted such magnetic parts through inadvertence during the course of conveyance, for example, and discriminating whether they are non-magnetic assembled products or not. The term "non-magnetic products" as used in the present specification embraces products which, in spite of using magnetic base materials, are prevented from retaining residual magnetization as by a surface treatment.

Now, the present invention will be described specifically below based on embodiments applied to sewn products with reference to the accompanying drawings.

FIG. 4 schematically illustrates the construction of one embodiment of the detecting apparatus of the present invention. As illustrated in FIG. 4, reference numeral 1 denotes a sewn product, 2 a high magnetic field disposed on a path for conveyance of the sewn product 1, 3 a sensing unit disposed on the downstream side of the high magnetic field 2, 4 a measuring unit connected to the sensing unit 3, and 5 a control unit (decision unit) connected to the measuring unit 4.

The sewn product 1 transported at a prescribed speed in the direction of an arrow X by a belt conveyor 7 (conveying means) stretched over and around a driving roller 8 driven by a drive motor (not shown) and a driven roller 9 first passes through the high magnetic field 2. When the sewn product 1 happens to have admitted a magnetic substance 10 such as a broken needle made of steel (ferromagnetic substance), this magnetic substance 10 is magnetized while passing through the high magnetic field 2. The high magnetic field 2 can be generated by any of the heretofore known magnetic field generating means such as permanent magnet or electromagnet. The magnetization may be effected in a vertical direction (the direction perpendicular to the sewn product) or in the direction of advance of the sewn product.

Figure 6:
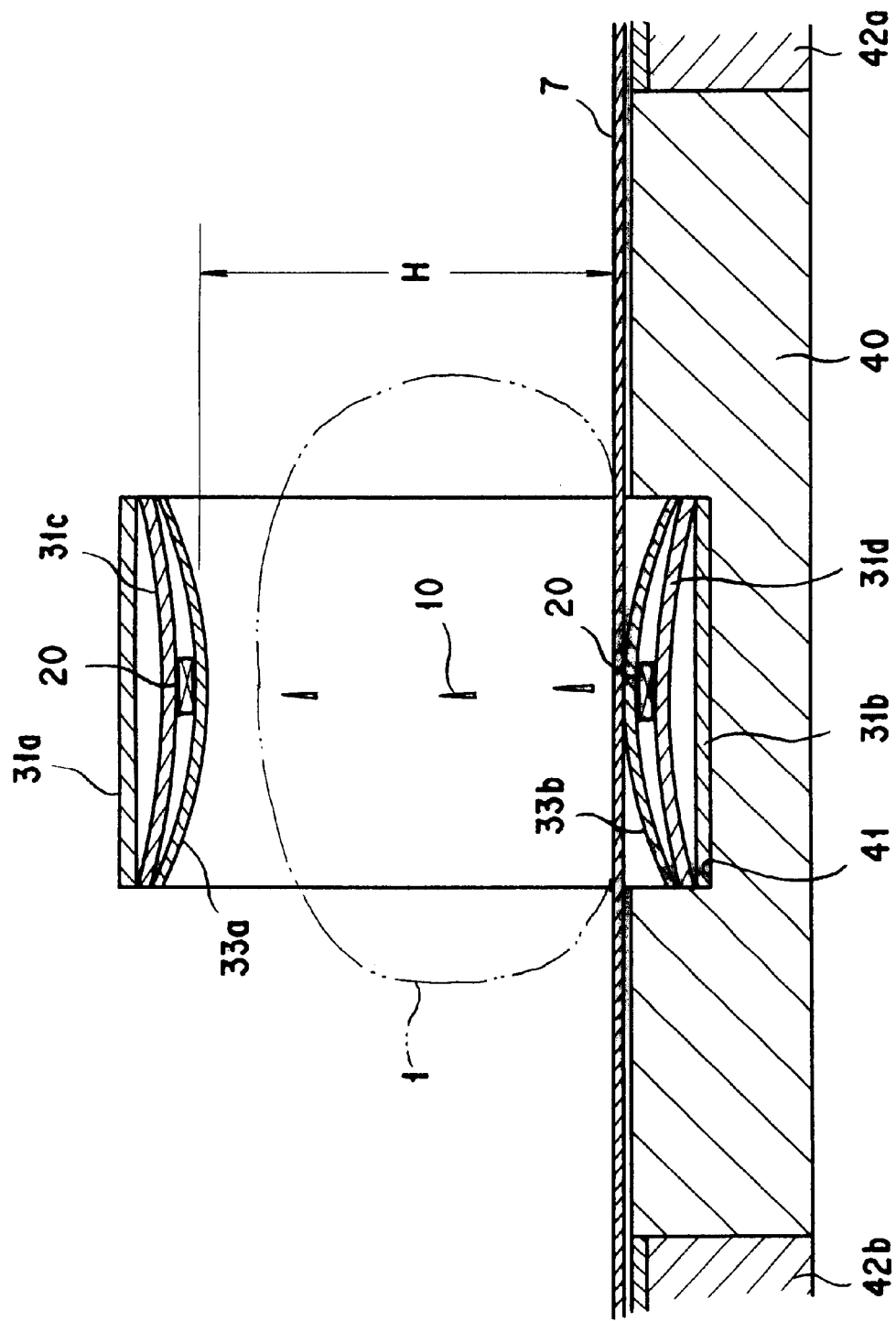
FIG. 6 is a cross-sectional view taken along the line VI—VI in FIG. 5.
Figure 7:
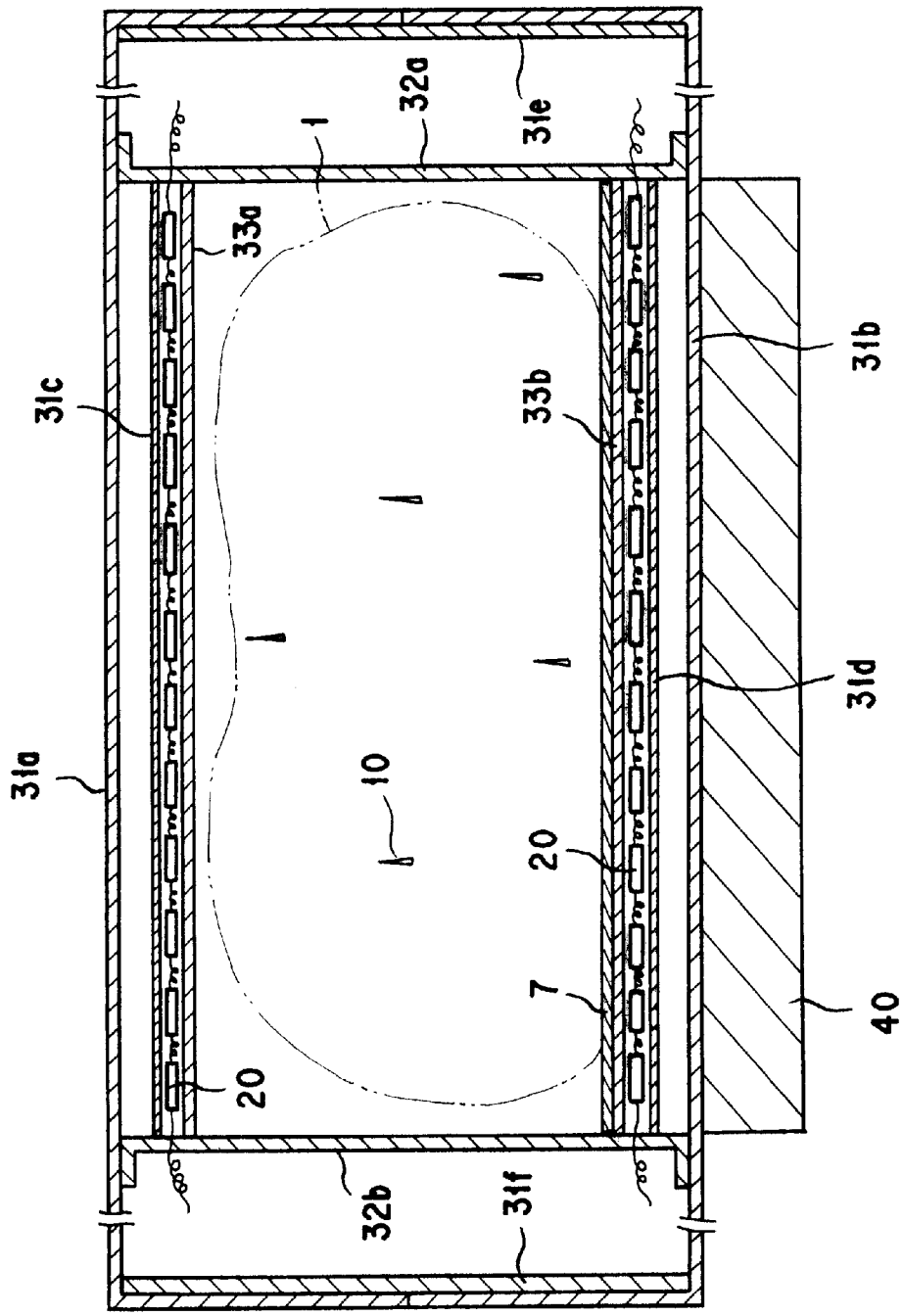
FIG. 7 is a cross-sectional view taken along the line VII—VII in FIG. 5.
Figure 8:
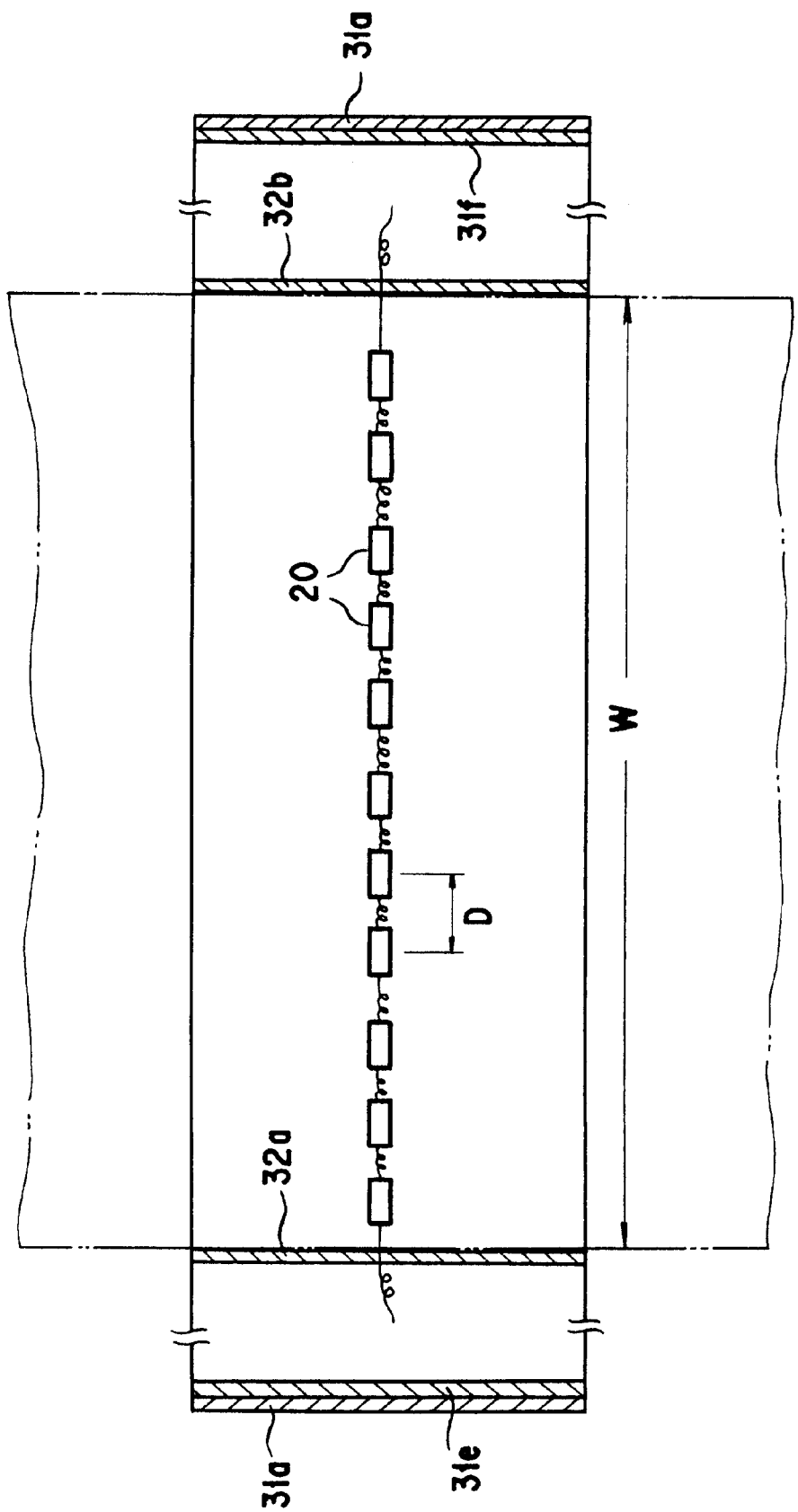
FIG. 8 is a lateral cross-sectional view illustrating location of magnetic sensors in the sensing unit shown in FIG. 5.

The residual magnetization which the magnetized magnetic substance 10 in the sewn product 1 retains after passing the high magnetic field 2 is detected by the sensing unit 3 disposed in the middle of the belt conveyor 7. The sensing unit 3 is provided with magnetic sensors such as Hall elements utilizing the Hall effect, MR elements (magnetoresistance elements) utilizing the magnetoresistance effect, MI effect elements (magnetoimpedance effect elements) utilizing the skin effect in the magnetic field, or coils (including coils for detecting a static magnetic field). A plurality of magnetic sensors 20 are disposed as opposed to the sewn product 1 transferred on the belt conveyor 7 and as spaced at intervals of a prescribed size D in the direction of width of the belt conveyor 7 as shown in FIG. 8. In consideration of the range of detection of sensor, the magnetic sensors 20 have the height H thereof above the conveyor (see FIG. 6) and the size D of the spaces thereof fixed by the sensitivity of sensor and the S/N ratio where they happen to be Hall elements. This rule holds good for the MR elements, MI elements, or coils. Where the height H is required to be great as when the sewn products under examination are voluminous, the magnetic sensors 20 may be disposed as vertically opposed across the conveying belt of the conveyor 7 as shown in FIG. 4 through FIG. 7. By this setup, the distance between the sensors and the conveyor can be increased.

The signal of detection of the magnetic substance 10 included in the sewn product 1 is emitted as a variation of voltage when the magnetic sensors are Hall elements or coils, as a variation of resistance when they are MR elements, or as a variation of impedance when they are MI effect elements. The signal of detection from the sensing unit 3 is supplied to the measuring unit 4 and measured by a highly sensitive gauss meter, for example. Since the output directly obtained by the highly sensitive gauss meter entrains a power source frequency noise, the measuring device is combined with a hum noise removing circuit and a frequency selecting and amplifying circuit (formed of a low pass filter and a high pass filter) as auxiliary electronic circuits so that only the part of the amplified signal of detection that falls within a prescribed frequency band is extracted and transmitted to the A/D converter of the control unit 5. The cut-off frequencies of the high pass filter and the low pass filter are decided in accordance with the frequency components of the signal of detection which depend on the speed of the conveyor. The output (voltage output) from the measuring unit 4 (gauss meter) is transmitted to the control unit 5 (decision unit) which is composed of the A/D converter, a sequencer, a CPU (central processing unit), etc. and is utilized for the control of the apparatus. For the prevention of the disturbance by an external noise, differential amplification using two or more sensors as one set is generally adopted. The use of this method, in addition to the use of shielding members, is effective in attaining the prevention under discussion. In order to detect the signal of a relatively thin magnetic flux in distinction from the external disturbance of a relatively wide magnetic flux, therefore, it is preferable to use the highly sensitive magnetic sensors of the differential amplification type including a plurality of sensors for differential amplification as one set (one block). The addition of a power source noise cut-off frequency selecting and amplifying circuit to the differential amplifying circuit, therefore, serves the purpose of improving the S/N ratio to a greater extent.

The control of the apparatus can be implemented in various modes. The ejection from the transfer line of a sewn product 1 having a magnetic substance 10 mingled therein may be attained, for example, by providing a selecting station 6 on the terminal end side of the belt conveyor 7 with an ejecting device (not shown), causing the control unit 5, in response to the detection by the sensing unit 3 of the residual magnetization of the magnetic substance 10 in the sewn product 1 and after a delay of a prescribed duration considerate of the speed of conveyance of the belt conveyor 7 (the time spent by the conveyance from the sensing unit 3 to the ejecting device), to transmit an ejection signal to the ejecting device, and prompting the ejecting device to respond to the ejection signal when the sewn product 1 reaches the position of the ejecting device. Alternatively, the operator posted at the selecting station 6 is enabled to know the presence of the magnetic substance in the sewn product 1 forwarded to him by providing the selecting station 6 with a display lamp or a sound generator and causing the control unit 5, in response to the detection of the residual magnetization of the magnetic substance 10 in the sewn product 1 and after a delay of the prescribed time, to transmit a signal to the display lamp or the sound generator and turn on the display lamp or the sound generator. The necessity for providing a plurality of gauss meters is obviated by causing a plurality of sensors to perform a scanning operation. Further, the position of a magnetic substance, for example, in the Y direction, i.e. the direction of arrangement of sensors (see FIG. 5) can be determined when such arrangement is capable of telling which sensors have effected required detection at a given time. When an encoder is provided on the rotating shaft of the conveyor, the position of a magnetic substance in the X direction, i.e. the direction of advance can be determined. The determination of such a position permits the detection of a magnetic substance at that position to be attained with ease. At times, even the removal of the magnetic substance can be realized.

FIG. 5 through FIG. 8 show one embodiment of the sensing unit 3 of the detecting apparatus. In the figures, the reference numeral 30 indicates a magnetic shielding framework. The magnetic shielding framework 30 comprises a pair of upper and lower magnetic shielding external frame members 31a and 31b each made of a soft magnetic material having a cross-sectional shape generally in the form of three sides of a square; a pair of upper and lower curved magnetic shielding plates 31c and 31d each made of a soft magnetic material and respectively attached to the inner surfaces of the upper part of the upper magnetic shielding external frame member 31a and of the bottom part of the lower magnetic shielding external frame member 31b in such a manner that the inwardly projecting curved faces are opposed to each other; opposed side plates 32a and 32b each made of a non-magnetic material such as, for instance, aluminium, brass, or plastics and disposed on both sides of the curved upper and lower magnetic shielding plate 31c and 31d; and magnetic shielding side plates 31e and 31f each made of a soft magnetic material and respectively attached to the inner surfaces of both lateral wall parts of the upper and lower magnetic shielding external frame members 31a and 31b to join and fix them together.

Each of the upper and lower curved magnetic shielding plates 31c and 31d has a curved surface projecting inwardly in the form curved along the direction of transfer (X direction) of the sewn product 1 as a non-magnetic product. A plurality of magnetic sensors 20 are arranged on each of the curved surfaces at intervals of a prescribed size D in the lateral direction (Y direction). The magnetic sensors 20 are covered with plastic sensor covers 33a and 33b. As the magnetic sensor 20, a highly sensitive magnetic sensor of the differential amplification type is used. It should be noted that a number of magnetic sensors and the interval D are set according to the performance of the sensor.

The magnetic shielding framework 30 is disposed in a laterally oriented concave part 41 of a non-magnetic base member 40 so that a belt conveyor 7 passes through the inside thereof, and the belt conveyor 7 keeps close contact with the lower sensor cover 33b while moving. It should be noted that bases made of iron may be used as conveyor bases 42a and 42b respectively disposed on the front side and the rear side of the base member 40.

The height H from the belt conveyor 7 to the upper magnetic sensors 20 (or sensor cover 33a) can be freely set according to the form of a non-magnetic product as an object for detection as well as to the performance of the magnetic sensors 20, but in the case of a sewn product, the height H is generally set at about 10 cm or more. The width W of the internal space of the sensing section (or the width of the belt conveyor 7) can also be freely set, but in the case of a sewn product, preferably the width is set at a value in the approximate range of from 50 to 100 cm.

As described above, the sensing unit 3 includes non-magnetic side plates 32a, 32b disposed on both sides of the belt conveyor 7 and the upper and lower curved magnetic shielding plates 31c, 31d each made of a soft magnetic material as well as the upper and lower magnetic shielding external frame members 31a, 31b disposed above and under the belt conveyor 7. Accordingly, when the sewn product 1 including the broken needle 10 previously magnetized is transferred by the belt conveyor 7 and passes through the magnetic shielding framework 30 as shown in FIG. 6 and FIG. 7, the magnetic flux generated by the broken needle 10 is absorbed by the upper and lower curved magnetic shielding plates 31c, 31d and converged in the vertical direction as shown in FIG. 2B and FIG. 3B mentioned above. As a result, the residual magnetization of the broken needle 10 can be detected by the upper and lower magnetic sensors 20 with high sensitivity. During this step, an external magnetic field is shut off by the upper and lower magnetic shielding external frame members 31a, 31b as well as by the magnetic shielding side plates 31e, 31f.

A position where the broken needle 10 is detected is identified in the control unit 5 as described below.

At first, signals from each set of the magnetic sensors 20 (in sets of four, for example) are inputted to an amplifier sequentially (in time sequence) by means of scanning with an electronic circuit (switching). When received a signal from a set of magnetic sensors, the control unit transmits a signal, of a plurality of display units provided above the belt conveyor 7, to a display unit having the number corresponding to the position of the set of sensors that have issued a signal and causes it to give the alarm (turns on an alarm lamp, for example). With this operation, the position of the broken needle 10 can be identified. In this case, the operation can be carried out by a system in which all the sensors are switched in turn by one unit of amplifier for signal input or a system in which each set of sensors is provided with an amplifier. In the latter system, although the cost is relatively higher, it is possible to connect only the first stage of differential amplification (preamplifier) to sensors as a set for maintaining stability in differential amplification.

Figure 9:
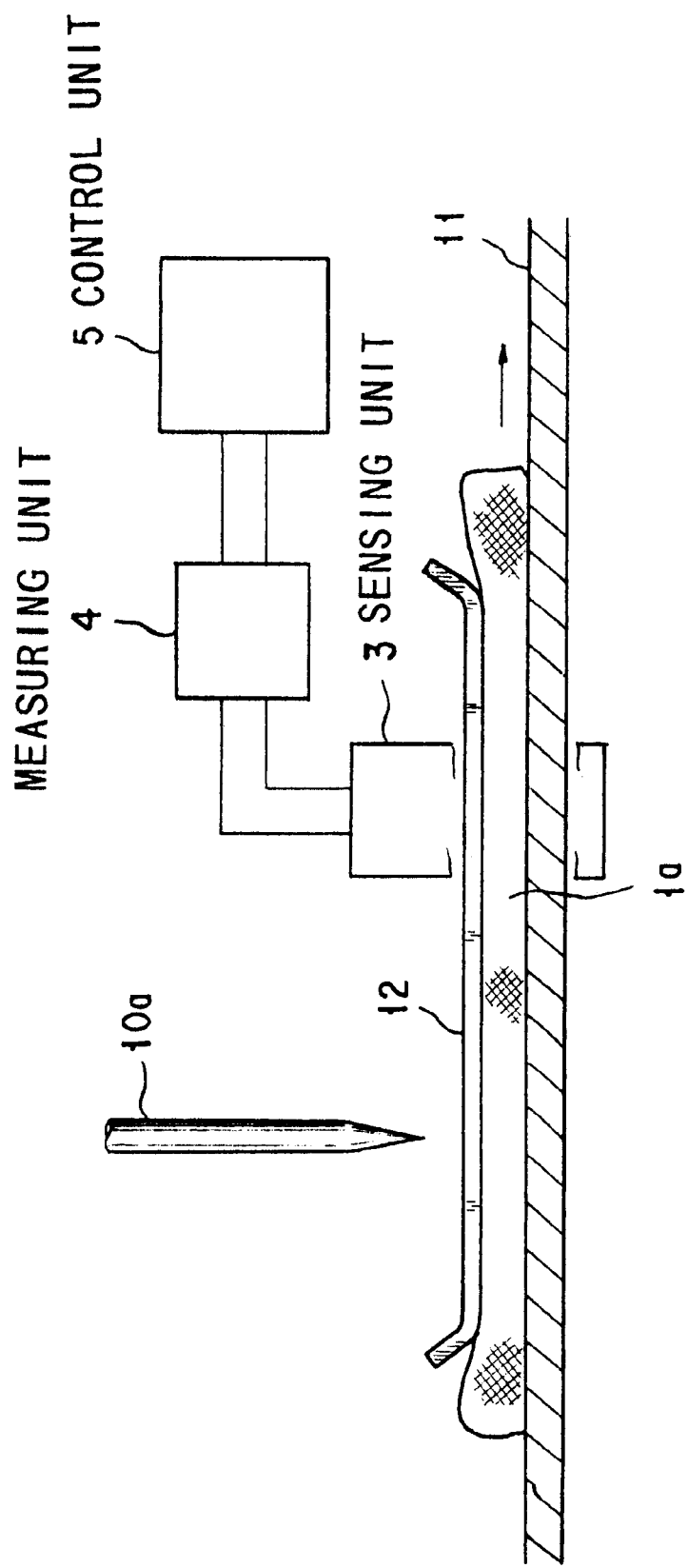
FIG. 9 is a schematic structural diagram illustrating another embodiment of the detecting apparatus of the present invention.

FIG. 9 schematically illustrates another embodiment of the detecting apparatus of the present invention. This apparatus allows the detection of residual magnetization of a magnetic substance to be effected immediately after the step of sewing.

A sewn product 1a laid on a ring-like rotary table 11 which is transferring means is guided by a sewing machine guide 12 and meanwhile sewn by a preparatorily magnetized needle 10a (magnetic substance). When the needle 10a is broken and mingled in the sewn product 1a, the residual magnetization of the broken needle is immediately detected by a sensing unit 3 disposed on the guide 12 so as to surround it and the signal of detection emitted from the sensing unit 3 is transmitted to a measuring unit 4. The signal of measurement emitted from the measuring unit 4 is outputted to a control unit 5. The control unit 5, after a delay of a prescribed time, transmits a signal to an alarm lamp (not shown) disposed at a predetermined position on the rotary table 11, for example, and turns on the alarm lamp.

Alternatively, an ejecting device may be employed in place of the alarm lamp to eject from the transfer line the sewn product 1a having the broken needle included therein. The sensing unit 3 is prepared by adapting the unit shown in FIG. 5 through FIG. 8 for the rotary table. The detailed illustration thereof is omitted because such modification will be obvious to a person skilled in the art.

The apparatus so constructed as illustrated in FIG. 9 enjoys such advantages as allowing a sewn product fresh from the step of sewing to be scanned to detect the presence or absence of a broken needle included therein, permitting a decrease in the number of component magnetic sensors and a decrease in the height of the sensing unit above the rotary table, i.e. the distance between the sewn product and the magnetic sensors, and consequently permitting the detection of the presence or absence of a magnetic substance to be attained with improved sensitivity.

Various ferromagnetic substances can be adopted as the material for the preparatorily magnetized needle 10a to be used in the embodiment mentioned above. Ideally, the needle is formed as a permanent magnet. Since needles of permanent magnet generally are not easy to manufacture, materials obtained by combining Fe with C, B, N, etc. and enabled to generate large residual magnetization are properly adopted and alloy materials of the Fe—Al, Mn system, Fe—Cr, Co, Ni system, etc. may be used advantageously. The needle 10a illustrated in FIG. 9 has the possibility of succumbing to the influence of heat and strain and consequently suffering the coercive force thereof to be varied while in use. It is, therefore, proper to interpose a high magnetic field between the needle and the sensing unit as illustrated in FIG. 4.

Figure 5:
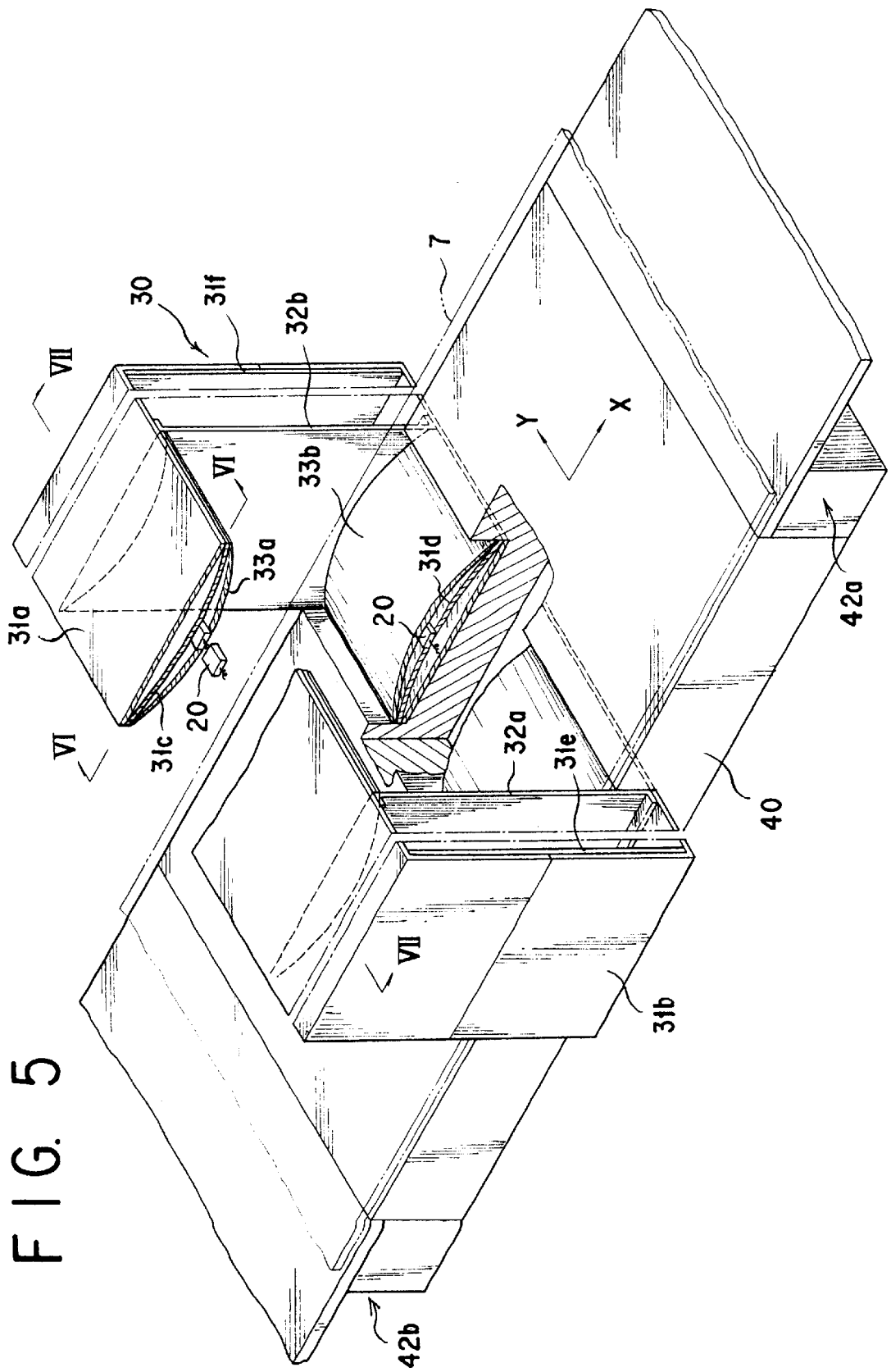
FIG. 5 is a partially broken perspective view illustrating structure of a sensing unit shown in FIG. 4.
Figure 10:
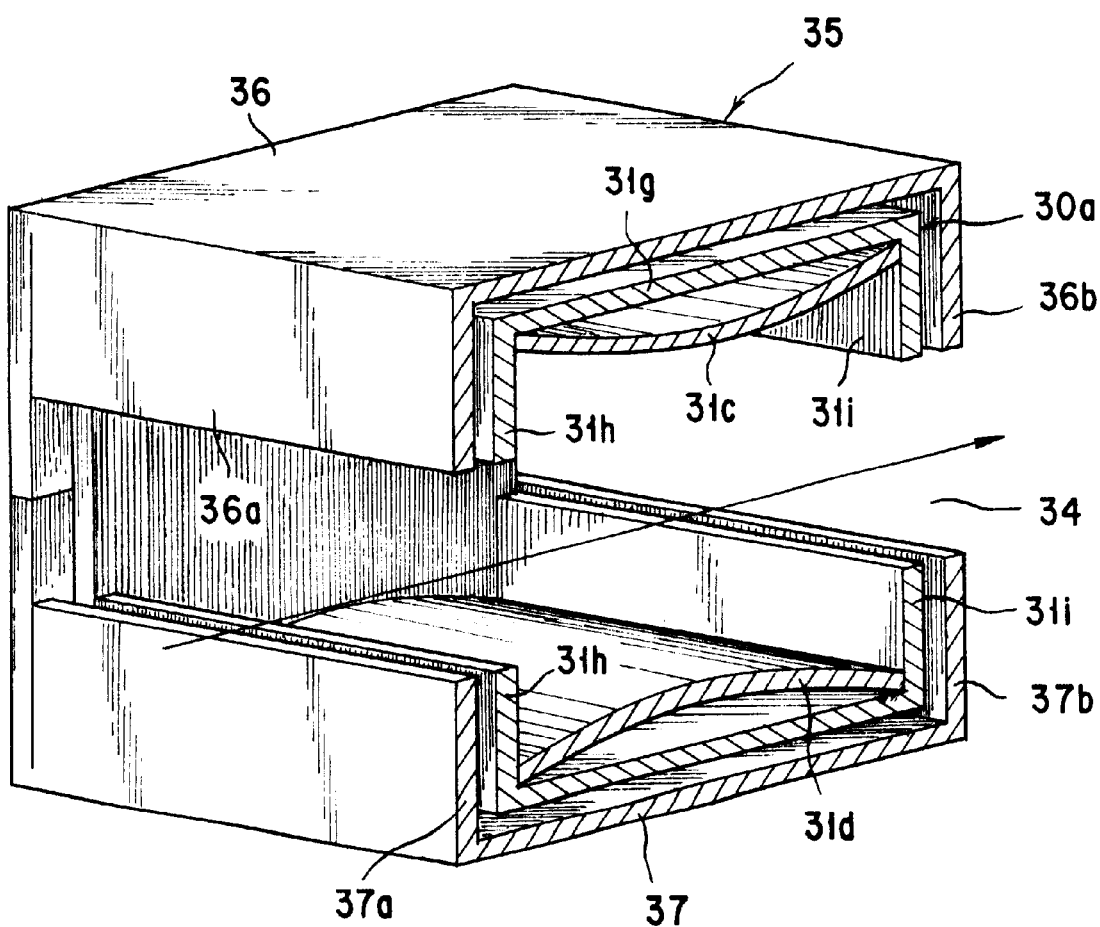
FIG. 10 is a sectioned perspective view showing another embodiment of the sensing unit of the detecting apparatus of the present invention.

FIG. 10 shows a modification of the sensing unit shown in FIG. 5 based on the mode for more effectively shutting off a magnetic field due to external disturbance.

A magnetic shielding framework 30a of the sensing unit shown in FIG. 10 comprises a magnetic shielding frame member 31g made of a soft magnetic material and having upper and lower front flange parts 31h and rear flange parts 31i respectively bent inwardly to form an opening 34. A pair of upper and lower curved magnetic shielding plates 31c and 31d each also made of a soft magnetic material are attached to the member 31g between the front flange part 31h and the rear flange part 31i of upper and lower ones respectively in such a manner that the respective curved surfaces projecting inwardly are opposed to each other. Likewise the sensing unit shown in FIG. 5, a plurality of magnetic sensors are arrayed in the lateral direction on the surfaces of the upper and lower curved magnetic shielding plates 31c and 31d respectively, and the magnetic sensors are covered with sensor covers, which are not shown in the figure. The magnetic shielding framework 30a is enclosed with a peripheral magnetic shielding external framework 35 comprising a pair of upper and lower external frame members 36 and 37 each also made of a soft magnetic material and having a cross-sectional shape generally in the form of three sides of a square, with a prescribed space through the medium of a block member made of polyvinyl chloride or the like (not shown) interposed therebetween. The upper and lower external frame members 36 and 37 of this magnetic shielding external framework 35 also have front flange parts 36a and 37a and rear flange parts 36b and 37b respectively bent inwardly to form thereby an opening for matching with the opening 34 of the magnetic shielding framework 30a. Conveying means (not shown) such as a conveyor for transferring a non-magnetic product under inspection is arranged so that it can move within the opening 34 in the direction indicated by the arrow mark.

As described above, it is possible to efficiently converge a magnetic flux created by the residual magnetization of a magnetic substance toward magnetic sensors, while shutting off a magnetic field due to external disturbance by covering the magnetic shielding framework 30a with the magnetic shielding external framework 35. As a result, it is possible to reliably detect a magnetic substance included in a non-magnetic product. Incidentally, an appropriate dielectric material such as plastic foam may be filled in a gap between the magnetic shielding framework 30a and the magnetic shielding external framework 35.

While certain specific embodiments have been disclosed herein, the invention may be embodied in other specific forms without departing from the spirit or essential characteristics thereof. The described embodiments are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

The entire disclosure of Japanese Patent Application No. 9-247614 filed on Aug. 29, 1997 including specification, claims, drawings and abstract are incorporated herein by reference in its entirety.

What is claimed is:

1. A method for detecting a magnetic substance included in a non-magnetic product, comprising the steps of:

applying a magnetic field to said product, then thereafter moving the magnetic substance with said non-magnetic product past a detector, converging a magnetic flux of residual magnetization of said magnetic substance included in said product to detect the residual magnetization, and judging the presence or absence of said magnetic substance in said product based on the detected residual magnetization.

2. The method according to claim 1, wherein a magnetic sensor is disposed at a prescribed position between a pair of opposed soft magnetic members, said non-magnetic product is located or passed through between the pair of soft magnetic members so that the magnetic flux generated by said magnetic substance included in said product is converged to the soft magnetic members, while shielding said magnetic sensor from a magnetic field caused by external disturbance, and the residual magnetization of said magnetic substance is detected by said magnetic sensor.

3. The method according to claim 2, wherein the residual magnetization of said magnetic substance is detected, while moving said non-magnetic product so as to pass through between said pair of soft magnetic members, by a plurality of magnetic sensors disposed as opposed across a prescribed distance to said product in motion and arranged at intervals of a prescribed size in a direction substantially perpendicular to the direction of movement of said non-magnetic product.

4. The method according to claim 1, wherein the intensity of the magnetic field to be applied to the product is equivalent to or greater than a level for imparting saturated magnetization.

5. The method according to claim 1, wherein said non-magnetic product is a woven and/or knitted product.

6. The method according to claim 1, wherein said non-magnetic product is a sewn product and said magnetic substance is a sewing needle.

7. A method for detecting a magnetic substance included in a non-magnetic product, comprising the steps of:

preparatorily applying a magnetic field to a magnetic substance having the possibility of being mingled in said product thereby causing said magnetic substance to assume a state of residual magnetization, then converging a magnetic flux of the residual magnetization of said magnetic substance included in said product to detect the residual magnetization, and judging the presence or absence of said magnetic substance in said product based on the detected residual magnetization.

8. The method according to claim 7, wherein a magnetic sensor is disposed at a prescribed position between a pair of opposed soft magnetic members, said non-magnetic product is located or passed through between the pair of soft magnetic members so that the magnetic flux generated by said magnetic substance included in said product is converged to the soft magnetic members, while shielding said magnetic sensor from a magnetic field caused by external disturbance, and the residual magnetization of said magnetic substance is detected by said magnetic sensor.

9. The method according to claim 8, wherein the residual magnetization of said magnetic substance is detected, while moving said non-magnetic product so as to pass through between said pair of soft magnetic members, by a plurality of magnetic sensors disposed as opposed across a prescribed distance to said product in motion and arranged at intervals of a prescribed size in a direction substantially perpendicular to the direction of movement of said non-magnetic product.

10. The method according to claim 7, wherein the intensity of the magnetic field to be applied to the product is equivalent to or greater than a level for imparting saturated magnetization.

11. The method according to claim 7, wherein said non-magnetic product is a woven and/or knitted product.

12. The method according to claim 7, wherein said non-magnetic product is a sewn product and said magnetic substance is a sewing needle.

13. An apparatus for the detection of a magnetic substance included in a non-magnetic product be detecting residual magnetization of the magnetic substance in the non-magnetic product comprising:

means for detecting residual magnetization of said magnetic substance included in said non-magnetic product, means for moving said non-magnetic product past said detecting means, and, means for converging flux of the residual magnetization to said detecting means.

14. The apparatus according to claim 13, wherein said converging means comprises a magnetic shielding member made of a soft magnetic material and disposed at the back side of said detecting means.

15. The apparatus according to claim 13, wherein said converging means comprises a pair of magnetic shielding members made of a soft magnetic material and adapted to allow said non-magnetic product to be located or passed through between the pair of magnetic shielding members.

16. The apparatus according to claim 14, wherein said magnetic shielding member has a curved surface projecting toward said non-magnetic product.

17. The apparatus according to claim 15, wherein said detecting means comprises a plurality of magnetic sensors arranged as spaced with a prescribed distance in a direction substantially perpendicular to the direction of movement of said product.

18. The apparatus according to claim 17, wherein said magnetic sensors are selected from the group consisting of a Hall element, a magnetoresistance element, a magnetoimpedance effect element, and a coil.

19. The apparatus according to claim 13, which further comprises means for measuring the intensity of residual magnetization of said magnetic substance detected by said detecting means.

20. An apparatus for the detection of a magnetic substance in a non-magnetic product, comprising:
means for conveying said non-magnetic product through the apparatus,
detecting means closely approximated to said conveying means and adapted to detect residual magnetization of said magnetic substance included in said product,
means for converging a magnetic flux of said residual magnetization to said detecting means, and
means for determining the presence or absence of said magnetic substance in said product based on the information from said detecting means.

21. The apparatus according to claim 20, which further comprises magnetic field generating means disposed on the upstream side of said detecting means and adapted to impart a magnetic field to said product.

22. The apparatus according to claim 20, wherein said detecting means comprises a plurality of magnetic sensors arranged as spaced with a prescribed distance in a direction substantially perpendicular to the direction of movement of said product.

23. The apparatus according to claim 22, wherein said magnetic sensors are selected from the group consisting of a Hall element, a magnetoresistance element, a magnetoimpedance effect element, and a coil.

24. The apparatus according to claim 20, wherein said converging means comprises a magnetic shielding member made of a soft magnetic material and disposed at the back side of said detecting means opposite the location of the product.

25. The apparatus according to claim 20, wherein said converging means comprises a pair of magnetic shielding members made of a soft magnetic material and adapted to allow said non-magnetic product to be passed through between the pair of magnetic shielding members.

26. The apparatus according to claim 24, wherein said magnetic shielding member has a curved surface projecting toward said non-magnetic product.

27. The apparatus according to claim 20, wherein said converging means comprises a framework opened at front and rear sides and having at least one pair of opposed wall plates each formed of a magnetic shielding member of a soft magnetic material, a plurality of detecting means are disposed in series in the lateral direction on an inner surface of said magnetic shielding member, and said conveying means is disposed inside said framework in such a manner that said conveying means extends from the rear side to the front side of said framework therethrough.

28. The apparatus according to claim 27, wherein said framework comprises upper and lower plates each formed of a magnetic shielding member of a soft magnetic material and having a curved surface projecting inwardly in the form curved along the direction of movement of said non-magnetic product, two side plates made of a non-magnetic material, and further magnetic shielding members of a soft magnetic material disposed on both sides so as to cover said two side plates, and said detecting means comprises a plurality of magnetic sensors disposed on each of the curved surfaces of said upper and lower plates at intervals of a prescribed size in the lateral direction thereof.

29. The apparatus according to claim 28, wherein said magnetic sensors are covered with a covering member.

30. The apparatus according to claim 20, wherein said converging means comprises an inner magnetic shielding framework made of a soft magnetic material and opened at front and rear sides and an outer magnetic shielding framework made of a soft magnetic meterial and opened at front and rear sides, said outer magnetic shielding framework enclosing said inner magnetic shielding framework.

31. The apparatus according to claim 30, wherein said inner magnetic shielding framework comprises upper and lower plates each made of a soft magnetic material and having a curved surface projecting inwardly in the form curved along the direction of movement of said non-magnetic product.

32. The apparatus according to claim 31, wherein said detecting means comprises a plurality of magnetic sensors disposed on each of the curved surfaces of said upper and lower plates at intervals of a prescribed size in the lateral direction thereof.

33. The apparatus according to claim 20, which further comprises means for measuring the intensity of residual magnetization of said magnetic substance detected by said detecting means.

* * * * *